United States Patent [19]

Salokangas et al.

[11] 4,196,082
[45] Apr. 1, 1980

[54] COMBINATION OF A BIOLOGICAL DRY TOILET AND A BIOLOGICAL WASTE WATER PURIFYING PLANT

[75] Inventors: Teuvo T. Salokangas; Unto T. Lammi; Tapani J. Miettinen, all of Lahti, Finland

[73] Assignees: Asko-Upo Oy, Lahti, Finland; AGA Heating AB, Göthenburg, Sweden

[21] Appl. No.: 936,548

[22] Filed: Aug. 24, 1978

[30] Foreign Application Priority Data

Sep. 2, 1977 [FI] Finland .................. 772613

[51] Int. Cl.² .................. B01D 21/02; C02C 1/06
[52] U.S. Cl. .................. 210/180; 210/187; 210/532 S
[58] Field of Search .......... 210/151, 152, 187, 532 S, 210/455; 4/111, 111.1

[56] References Cited

U.S. PATENT DOCUMENTS

| 185,604 | 12/1876 | Watt | 210/455 |
|---|---|---|---|
| 1,290,886 | 1/1919 | Booker | 210/532 S |
| 1,950,841 | 3/1934 | Crawford | 210/532 S |
| 2,432,887 | 12/1947 | Haviland | 210/532 S |
| 3,126,333 | 3/1964 | Williams | 210/532 S |
| 3,327,855 | 6/1967 | Watson et al. | 210/152 |
| 3,762,549 | 10/1973 | Crampton | 210/152 X |
| 3,966,604 | 6/1976 | Diggs | 210/151 |

FOREIGN PATENT DOCUMENTS

13488 of 1909 United Kingdom .................. 210/151

Primary Examiner—John Adee
Attorney, Agent, or Firm—Ladas, Parry, Von Gehr, Goldsmith & Deschamps

[57] ABSTRACT

A combination of a biological dry toilet and a biological waste water purifying plant. In the combination the heat and coarse sludge of the so called grey water from households is recovered in the dry toilet to which also the fine sludge from the waste water purifying plant is pumped. The heat obtained is used for heating the compost and both sludges collected in the filters are from time to time combined to compost them together with the other waste in the dry toilet. A suction fan in the dry toilet also sucks the air needed by the biofilter through the filter bed. The purified water obtained from the waste water purifying plant is absorbed in the soil.

2 Claims, 1 Drawing Figure

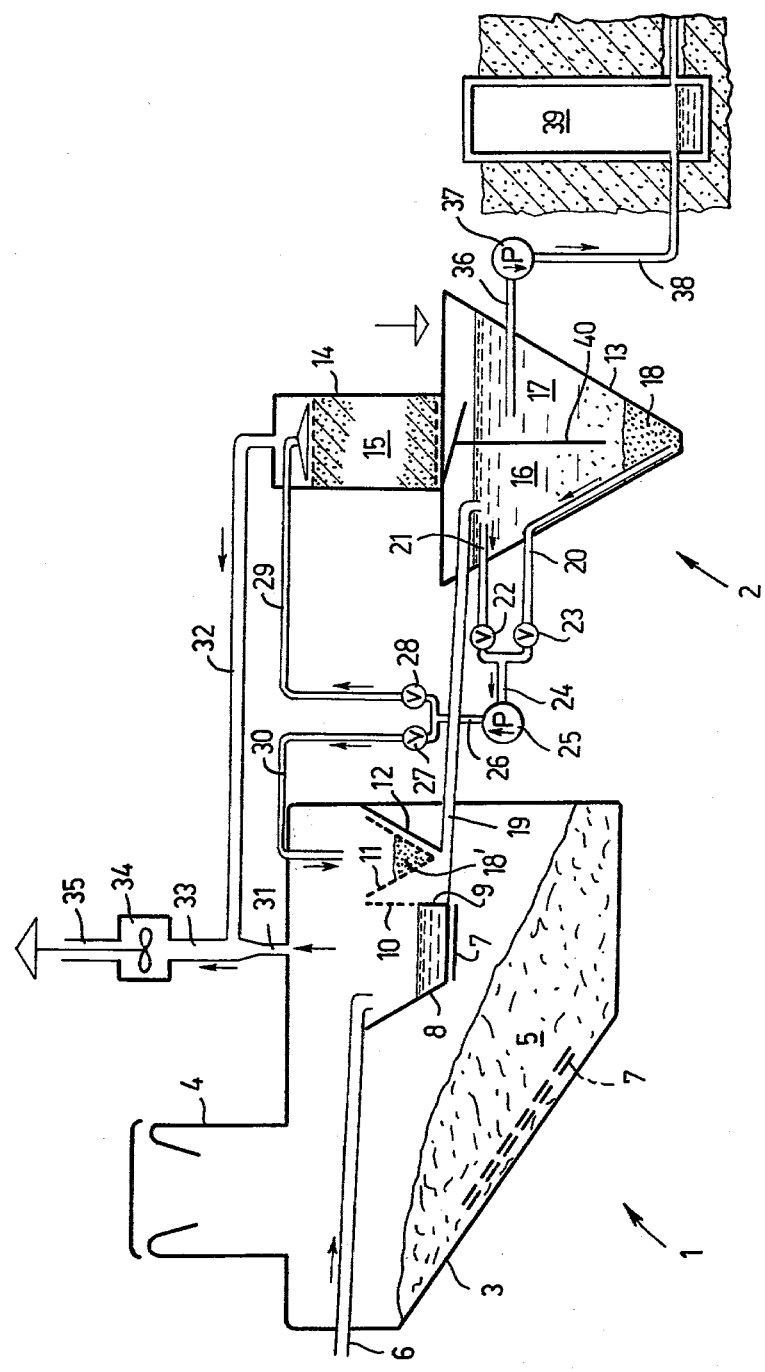

COMBINATION OF A BIOLOGICAL DRY TOILET AND A BIOLOGICAL WASTE WATER PURIFYING PLANT

The present invention relates to a combination of a biological waste water purifying plant, wherein the dry toilet comprises
  a tank for composting waste, and
  a means for change of air in the tank, and the waste water purifying plant comprises:
  a sludge sedimentation tank,
  a biofilter through which the water to be purified is circulated,
  a means for change of air in the biofilter,
  a means for circulating the water to be purified in the biofilter,
  a means for removing the purified water from the sludge sedimentation tank, and
  a means for removing the sludge from the lower part of the sedimentation tank.

Such a combination is intended for sewerless houses for treating toilet and kitchen waste and the so called grey water produced in households by means of a biological dry toilet and a biofilter cooperating with each other.

Amongst others the following arrangements are previously known:
  (1) A biological and/or chemical waste water purifying plant to which also a water closet is connected.
  (2) A biological and/or chemical waste water purifying plant and a separate biological dry toilet the operations whereof are in no way combined.

The biggest disadvantages of the arrangement according to the above point (1) are the following:
  (a) The plant must due to its fairly big size be placed outdoors and the utilization of the heat energy contained by the waste water difficult.
  (b) Due to pathogenic danger, the purified water must often be chlorinated.
  (c) For sludge removal, a special vehicle must be used the access whereof to the plant must be ensured.
  (d) To place such sludge on a dumping ground may be forbidden in the future.

Besides these disadvantages, the arrangement according to the above point (2) has the following disadvantages:
  (a) The carbon/nitrogen ratio of the dry toilet remains too small due to the small amount of carbon wherefore composting is retarded and/or remains incomplete.
  (b) To accelerate the composting, electric heating must usually be used wherefore the energy consumption increases.

It is the object of the present invention to eliminate the above mentioned disadvantages and to produce a new combination of a biological dry toilet and a biological waste water purifying plant.

The basic idea of the invention is to combine the operations of a biological dry toilet and a biological waste water purifying plant so that, in the combined plant, the heat and coarse sludge of the so called grey water from households is recovered in the dry toilet to which also the fine sludge from the waste water purifying plant is pumped. The heat obtained is used for heating the compost and both sludges collected in the filters are from time to time combined to compost them together with the other waste in the dry toilet. Moreover, the suction fan of the dry toilet also sucks the air needed by the biofilter through the filter bed. The purified water obtained from the waste water purifying plant can be absorbed in the soil.

More specifically, the combination according to the invention is mainly characterized by
  a means for feeding the water to be purified through the dry toilet,
  a means for mechanically purifying said water in connection with the dry toilet,
  a means for feeding said water to the sedimentation tank in the biological purifying plant, and
  a means of reducing the water content of the sludge removed from the lower part of the sedimentation tank in connection with the dry toilet so that the waste from the mechanical purification and the separated sludge can be mixed with the waste already deposited on the bottom of the tank in the dry toilet.

Specific embodiments of the combination according to the invention are characterized by the arrangements according to claims 2 to 7.

By means of the invention amongst others following advantages are obtained:
  (1) The heat contained in the grey water, for example, from dish washing and washing machines is utilized in composting.
  (2) The coarse and fine sludge need no longer be carried away because the composting result of the sludge is only about 1/10 of the initial weight, and the compost obtained from the dry toilet may be used, for example, on residential lots as fertilizing agent.
  (3) Any manual emptying operations may be carried out in the same space.
  (4) The same fan sucks the air needed both by the biofilter and by the dry toilet. Initial costs and supervision are reduced.
  (5) As the faeces with the highest content of pathogens do not get into the waste water purifying plant, the water purified in the plant may in general be absorbed in the soil, for example, on a residential lot.
  (6) If the entire combination is placed, e.g., in a basement which, in practice, is the best place for the tank portion of the dry toilet, it is easy to supervise also in winter and the surplus heat from the various processes can be utilized in the basement.

The invention will now be described in more detail by means of the embodiment according to the accompanying drawing. The drawing illustrates in schematic longitudinal section one preferred embodiment of the combination according to the invention.

A dry toilet 1 included in the combination comprises a tank 3 for composting waste 5, a seat 4 and a suction fan 34 which through a pipe 31 changes the air in the tank 3 and blows it through a pipe 35 to the outer air.

A waste water purifying plant 2 included in the combination comprises a sludge sedimentation tank 13 also serving as a circulation tank for the water to be purified. The tank 13 is in its upper part divided by a vertical partition wall 40 into two compartments 16 and 17. The water to be purified flows into the first mentioned compartment 16 through a pipe 19, said water being fed by means of a pump 25 through pipes 21, 24, 26, and 29 to a biofilter 14. After having passed through a biological filter bed 15 known per se the purified water gets into the compartment 17 on the other side of the partition wall 40.

The grey water first arrives through a pipe 6 to a basin 8 inside the tank 3 of the dry toilet 1, one wall 9, 10 of said basin serving as a mechanical purifying means such that the upper part 10 of the wall works as a mechanical filter and the lower part 9 of the wall as a damming sill. The purpose of this damming sill 9 is to produce a delay for the through-flow of the grey water so that a heat exchanger 7 arranged in connection with the basin 8 could more efficiently heat the composting waste 5 in the tank 3.

Alternatively, the heat exchanger may be placed on the bottom of the tank in the dry toilet so as to be in contact with the waste while the combination is in use. This solution is outlined by broken lines 7'.

From the tank the grey water flows through the previously mentioned pipe 19 to the sedimentation tank 13 on the inlet side 16 of the water to be purified. On the bottom of the sedimentation tank 13, fine sludge is sedimented which, through the previously mentioned pump 25 and pipes 20, 24, 26, and 30, can be transferred to a dewatering means 11, 12 inside the tank 3 of the dry toilet 1, the filter portion 11 of said dewatering means being made of a composting material, e.g., paper. The water flowing through said filter portion 11 is also arranged to get into said pipe 19 through which it flows to the sedimentation tank 13. The filter portion 11 of the dewatering means is supported on a supporting frame 12 in the wall of the tank 3.

Since the pump 25 both circulates water to be purified and pumps sludge 18 from the bottom of the sedimentation tank 13, the pipes 21 and 29 of the "water circuit" are provided with valves 22 and 28, respectively, and the pipes 20 and 30 of the "sludge circuit" with valves 23 and 27, respectively. As now the removal of the sludge 18, 18' and the circulation of the water to be purified are arranged to be carried out alternately by means of the common pump, either valves 22 to 28 or valves 23 and 27 are at the same time open or closed, respectively.

The relatively clean water in the sedimentation tank 13 is removed by means of a pump 37 through pipes 36 and 38, for example, in the very early morning when the water is at its cleanest. The removal takes place close to the upper surface of the liquid in the tank. In the example case, the purified water is drained into the ground through a well 39 but in principle it may be led also directly into the ground.

The sludges 18' collected in the mechanical purifying means 8, 9, 10 and in the dewatering means 11 are from time to time emptied by mixing them into the composting waste 5 on the bottom of the tank 3 in the dry toilet 1. It should be noted that the operation of the equipment is not hampered by an overfilling of the dewatering filter 11, as, in this case, the excess sludge simply gets through the pipe 19 back to the sedimentation tank 13 for renewed purification.

It should be mentioned that the sludge collected in the mechanical purifying means 8, 9, 10 and the dewatering means 11 can be transferred into the waste 5 either manually or mechanically.

The biofilter 14, 15 is through pipes 32 and 33 connected to the previously mentioned suction fan 34 so that the need for air of both the dry toilet 1 and the biofilter 2 can be satisfied by using the common suction fan.

It is obvious that the combination according to the invention may be realized differently from the embodiment shown, amongst others, such that there need be no basin in connection with the mechanical purifying means 8, 9, 10 or such that no actual heat exchanger 7, 7' is used, etc.

We claim:
1. An integrated domestic sewage disposal and water purification system comprising in combination:
   a dry toilet;
   a main tank for composting waste;
   a sludge sedimentation tank having an upper part and a lower part;
   a biofilter through which the water to be purified is circulated;
   first pipe means for removing water from the upper part of the sedimentation tank to the biofilter;
   second pipe means for removing sludge from the lower part of the sedimentation tank to the main tank;
   third pipe means for feeding gray water from the household to mechanical purifying means;
   heat exchanger means for extracting heat from said gray water and passing this heat to the waste composting in said main tank;
   fourth pipe means for feeding the mechanically purified water from said mechanical purifying means to the sludge sedimentation tank;
   and a common suction fan for changing the air in the dry toilet and the biofilter.
2. An integrated system as claimed in claim 1, comprising a common pump for alternately removing from said sedimentation tank water through said first pipe means and sludge through said second pipe means.

* * * * *